United States Patent
Ito et al.

(10) Patent No.: US 12,459,362 B2
(45) Date of Patent: Nov. 4, 2025

(54) DISPLAY DEVICE

(71) Applicant: TOYOTA JIDOSHA KABUSHIKI KAISHA, Toyota (JP)

(72) Inventors: Hironori Ito, Tokyo (JP); Naoki Nishimura, Tokyo (JP); Takashi Ota, Tokyo (JP); Hisanobu Inoue, Kawasaki (JP); Kana Yamashita, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/608,218

(22) Filed: Mar. 18, 2024

(65) Prior Publication Data
US 2024/0336141 A1 Oct. 10, 2024

(30) Foreign Application Priority Data
Apr. 10, 2023 (JP) ................... 2023-063349

(51) Int. Cl.
*B60K 35/81* (2024.01)
*B60K 35/22* (2024.01)

(52) U.S. Cl.
CPC .............. *B60K 35/81* (2024.01); *B60K 35/22* (2024.01); *B60K 2360/171* (2024.01); *B60K 2360/175* (2024.01); *B60K 2360/1868* (2024.01); *B60K 2360/21* (2024.01); *B60R 2300/607* (2013.01)

(58) Field of Classification Search
CPC .. B60K 35/81; B60K 35/22; B60K 2360/171; B60K 2360/175; B60K 2360/1868; B60K 2360/21; B60K 35/00; B60K 2360/166; B60K 35/28; B60R 2300/607
See application file for complete search history.

(56) References Cited

U.S. PATENT DOCUMENTS

| | | | |
|---|---|---|---|
| 2012/0072097 A1 | 3/2012 | Ohta et al. | |
| 2020/0064839 A1* | 2/2020 | Oyama | B60K 28/10 |
| 2020/0202143 A1* | 6/2020 | Viswanathan | G06V 20/588 |
| 2022/0070638 A1 | 3/2022 | Takabtake et al. | |
| 2022/0126864 A1* | 4/2022 | Moustafa | H04W 4/46 |
| 2024/0416908 A1* | 12/2024 | Taniguchi | B60W 30/12 |

FOREIGN PATENT DOCUMENTS

| JP | 2011-1049 A | 1/2011 |
|---|---|---|
| JP | 2022-41286 A | 3/2022 |

* cited by examiner

*Primary Examiner* — Farzana Hossain
(74) *Attorney, Agent, or Firm* — Sughrue Mion, PLLC

(57) ABSTRACT

A display device includes an image generation unit configured to generate a status image presented to a driver of the vehicle, the status image representing to a current status of the vehicle and surroundings of the vehicle; a map information acquisition unit configured to acquire the map information and recognize an acquisition status of the map information; a display mode setting unit configured to set a display mode; and a display control unit configured to display the status image on a display unit in the display mode. The acquisition status includes a first case, a second case, and a third case in which the map information is temporarily unavailable. The display mode setting unit sets the display mode so that the display mode of the first case, the second case and the third case are different from each other.

4 Claims, 6 Drawing Sheets

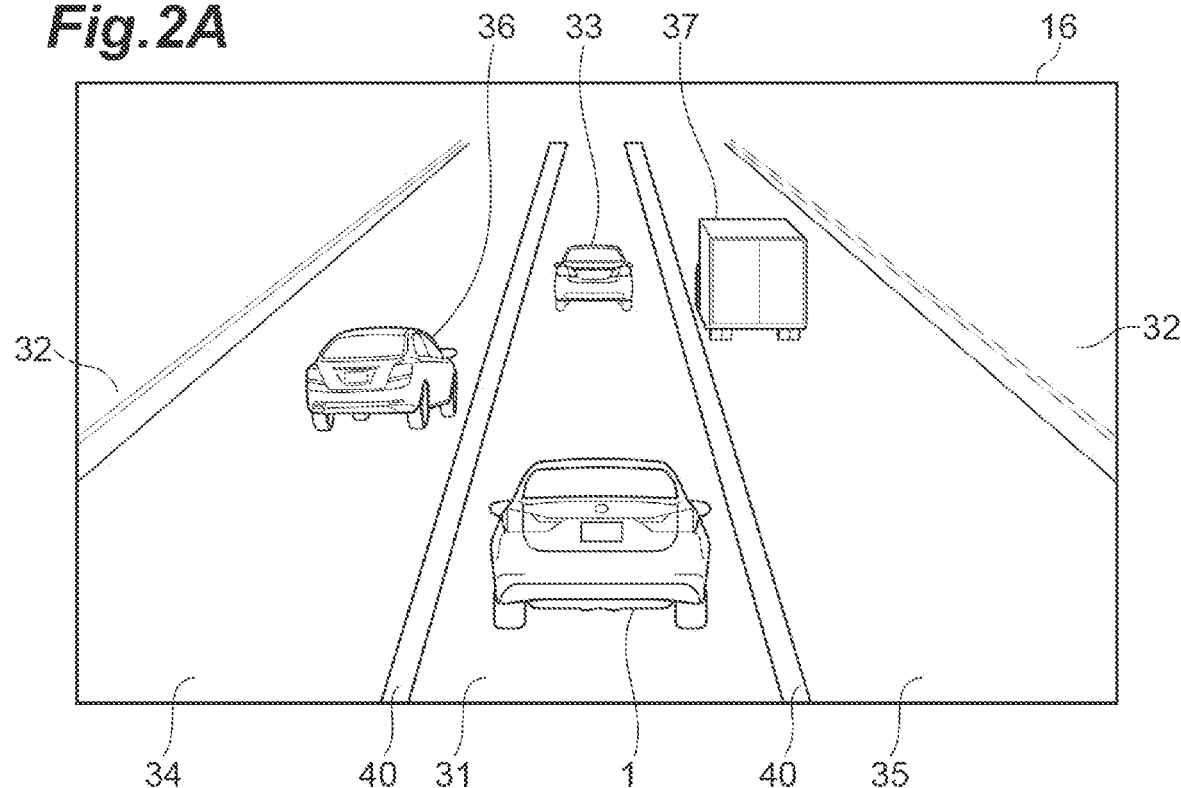
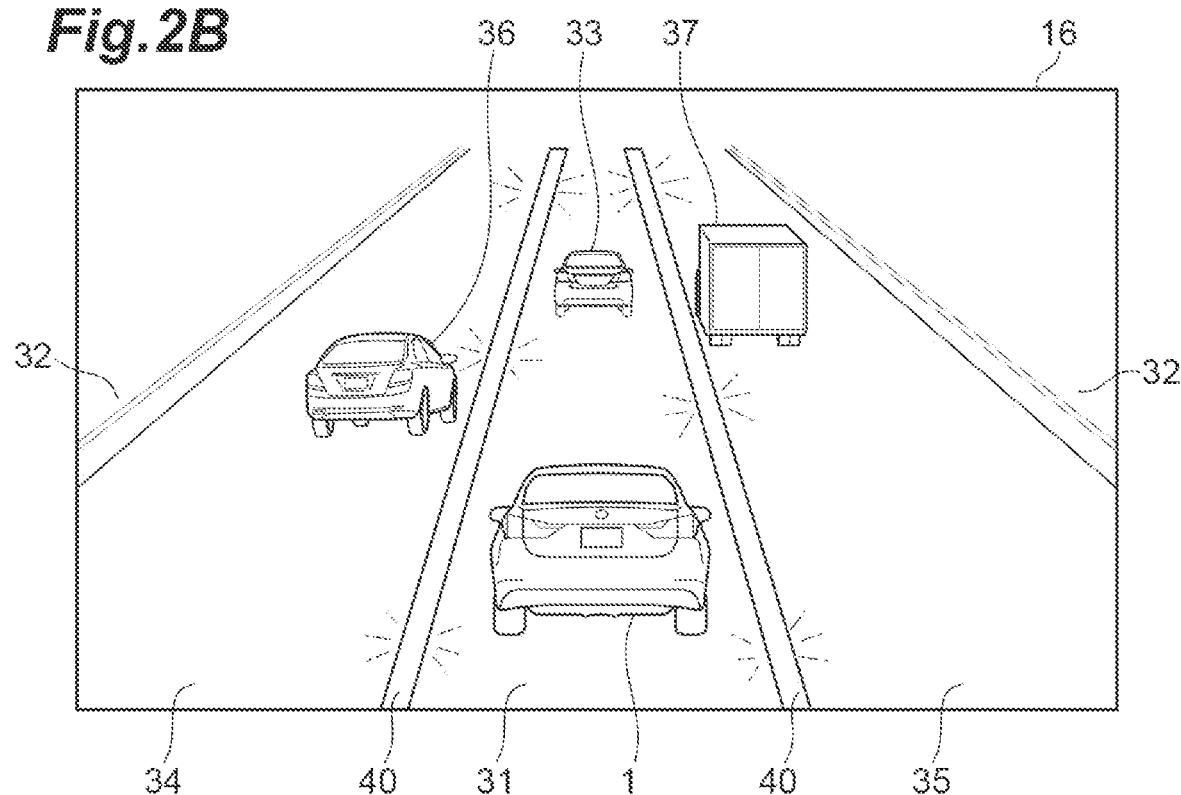

DISPLAY DEVICE

TECHNICAL FIELD

The present disclosure relates to a display device.

CROSS-REFERENCE TO RELATED APPLICATION

This application claims the benefit of priority from Japanese Patent Application No. 2023-063349, filed on Apr. 10, 2023, the entire contents of which are incorporated herein by reference.

BACKGROUND

There has been known a display control device for displaying a surrounding landmark located in a lane in which a vehicle is traveling on a display unit provided in the vehicle interior during autonomous driving (for example, Japanese Patent Application Laid-Open No. 2022-041286).

In a vehicle configured to execute autonomous driving control up to a predetermined assist level, the actual assist level of the autonomous driving control executed may be lower than the predetermined assist level. For example, the assist level may depend on an acquisition status of map information corresponding to the autonomous driving control at the predetermined assist level. In such a case, it may be difficult for a driver of the vehicle to recognize the actual assist level, for example, when an image to be presented to the driver for the lower assist level is displayed on the display unit in a same display mode as a display mode used for the predetermined assist level.

SUMMARY

An example of the present disclosure is a display device provided in a vehicle configured to acquire map information that allows autonomous driving control at a predetermined assist level to be executed, and configured to execute the autonomous driving control at the predetermined assist level based on the map information, the display device includes: an image generation unit configured to generate a status image presented to a driver of the vehicle based on detection result of an external sensor of the vehicle, the status image representing to a current status of the vehicle and surroundings of the vehicle; a map information acquisition unit configured to acquire the map information and configured to recognize an acquisition status of the map information; a display mode setting unit configured to set a display mode of the status image based on the acquisition status of the map information; and a display control unit configured to display the status image on a display unit of the vehicle in the display mode. The acquisition status includes a first case in which the map information is acquired and the autonomous driving control at the predetermined assist level is allowed to be executed, a second case in which the map information is acquired and the autonomous driving control at the predetermined assist level is not allowed to be executed, and a third case in which the map information is temporarily unavailable. The display mode setting unit sets the display mode so that the display mode of the first case, the display mode of the second case and the display mode of the third case are different from each other.

According to the display device according to an example of the present disclosure, the display mode of the status image in the third case in which the map information is temporarily unavailable is set so as to be different from the first case and the second case. The first case is a case in which the map information is acquired and the autonomous driving control at the predetermined assist level is allowed to be executed. The second case is a case in which the map information is acquired and the autonomous driving control at the predetermined assist level is not allowed to be executed. Therefore, the driver can more easily recognize that the autonomous driving control at the predetermined assist level is not actually executed, by recognizing the status image displayed in the display mode of the third case.

In some examples, the status image may include an image representing a lane line along a lane in which the vehicle is traveling, and the display mode setting unit may set the display mode such that the image representing the lane line in the third case is shorter than the image representing the lane line in the first case and the second case. In this case, the driver can more easily recognize that the autonomous driving control at the predetermined assist level is not actually executed, since the driver recognizes the image representing the lane line that appears shorter extending in the traveling direction of the vehicle.

In some examples, the status image may be a bird's-eye view image representing the vehicle from the rear, and the display mode setting unit may set the display mode such that an angle at which the vehicle is viewed from the rear in the third case is different from angles at which the vehicle is viewed from the rear in the first case and the second case. In this case, the driver can more easily recognize that the autonomous driving control at the predetermined assist level is not actually executed, since the driver recognizes the bird's-eye view image in the third case, which represents the vehicle from the rear at a different angle from the angles in the first case and the second case.

According to examples of the present disclosure, the driver can more easily recognize that the autonomous driving control at the predetermined assist level is not actually executed.

BRIEF DESCRIPTION OF THE DRAWINGS

FIG. 2A is a diagram showing a first display example of the status image.

FIG. 2B is a diagram showing a second display example of the status image.

DETAILED DESCRIPTION

Figure 1:
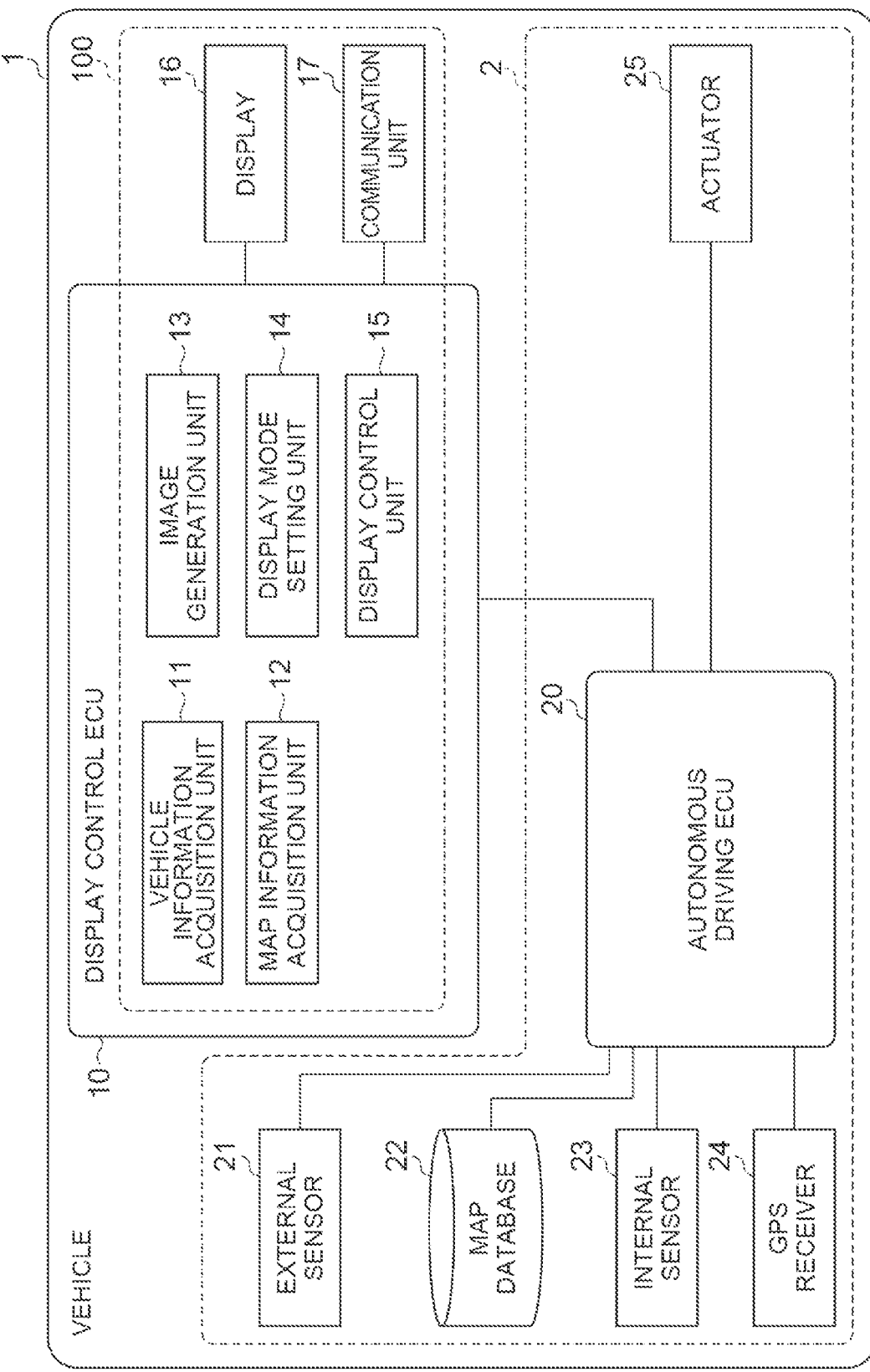
FIG. 1 is a block diagram showing a vehicle having an example display device according to the present disclosure.

Hereinafter, an example of the present disclosure will be described with reference to the drawings. In the following description, the same or corresponding elements are denoted by the same reference numerals, and redundant description is omitted.

FIG. 1 is a block diagram showing a vehicle having an example display device according to the present disclosure. As shown in FIG. 1, a display device 100 is mounted on a vehicle 1 capable of performing autonomous driving control at a predetermined assist level. The vehicle 1 is, for example, a passenger car.

[Configuration of Autonomous Driving System]

The vehicle 1 is equipped with an autonomous driving system 2. The autonomous driving system 2 is a system that performs autonomous driving control of the vehicle 1. Autonomous driving control is a vehicle control in which the vehicle 1 is automatically driven along a road on which the vehicle 1 is traveling without a driving operation by a driver.

The autonomous driving system 2 includes an autonomous driving ECU (Electronic Control Unit) 20, an external sensor 21, a map database 22, an internal sensor 23, GPS (Global Positioning System) receiver 24, and an actuator 25.

The autonomous driving ECU 20 includes a central processing unit (CPU), a read only memory (ROM), RAM (Random Access Memory), CAN (Controller Area Network) communication circuit and the like. The autonomous driving ECU 20 controls hardware based on a signal output from the CPU, and realizes functions of the autonomous driving ECU 20 described later. The autonomous driving ECU 20 operates the CAN communication circuit to input and output data, stores the input data in the RAM, loads programs stored in the ROM into the RAM, and executes the programs loaded into the RAM.

The external sensor 21 includes at least either a camera or a radar sensor. A camera is an imaging device that images the surrounding environment of the vehicle 1. The camera is provided on a back side of a windshield of the vehicle 1, for example, and captures images in front of the vehicle 1. The radar sensor is a detection device that detects an object around the vehicle 1 using radio waves (for example, millimeter waves) or light. The radar sensor includes, for example, a radar (millimeter wave radar) or a light detection and ranging (LiDAR). The external sensor 21 transmits detection information about objects around the vehicle 1 to the autonomous driving ECU 20.

The map database 22 is a database that stores map information. The map database 22 is formed, for example, in a hard disk drive (HDD) mounted on the vehicle 1. The map information stored in the map database 22 includes, for example, position information of roads, information of road shapes (for example, curvature information), position information of intersections and branch points, and the like.

The map information stored in the map database 22 is a so-called navigation map. This map information has an accuracy that allows autonomous driving control at level 2.0 to be executed, for example. The map information stored in the map database 22 is not accurate enough to allow autonomous driving control at level 2.9, for example. The map information capable of executing autonomous driving control at level 2.9 is so-called "high-accuracy map information." The high-accuracy map information includes information with higher accuracy regarding positions of roads, shapes of roads, and the like, than the navigation map. In the following description, map information capable of executing autonomous driving control of level 2.9 may be simply referred to as "high-accuracy map information".

The autonomous driving system 2 is a system capable of performing the autonomous driving control at the predetermined assist level when map information to be used includes the high-accuracy map information. The autonomous driving system 2 can automatically switch between performing the autonomous driving control at the predetermined assist level and performing the autonomous driving control at lower than the predetermined assist level, depending on whether or not the map information to be used includes the high-accuracy map information, for example.

The predetermined assist level may be, for example, level 2.9. Autonomous driving control of level 2.9 can be considered to be a high functional mode included in a group of autonomous driving control of level 2. The autonomous driving control of level 2.9 here can bring highly accurate controllability, high disturbance resistance and the like, at a higher vehicle speed (set vehicle speed) compared to vehicle speed supported by autonomous driving control of assist level less than 2.9. Hereinafter, the autonomous driving control of assist level less than 2.9 is simply referred to as "level 2.0."

The internal sensor 23 is an on-vehicle sensor that detects the traveling state of the vehicle 1. The internal sensor 23 may include a vehicle speed sensor, an acceleration sensor, and a yaw rate sensor. Known sensors can be used as the vehicle speed sensor, the acceleration sensor, and the yaw rate sensor. The internal sensor 23 transmits detection information about the traveling state of the vehicle 1 to the autonomous driving ECU 20.

The GPS receiver 24 receives signals from three or more GPS-satellites to measure the position of the vehicle 1 (e.g., the latitudes and longitudes of the vehicle 1). The GPS receiver 24 transmits measured position information of the vehicle 1 to the autonomous driving ECU 20.

The actuator 25 is a device used for traveling control of the vehicle 1 and operates in response to control signals from the autonomous driving ECU 20. The actuator 25 includes at least a drive actuator, a brake actuator, and a steering actuator. The drive actuator is provided in, for example, an engine or an electric motor as a power source, and controls the driving force of the vehicle 1. The brake actuator is provided in a hydraulic brake system, for example, and controls the braking force applied to the wheels of the vehicle 1. The steering actuator is, for example, an assist motor of an electric power steering system (EPS), and controls steering torque of the vehicle 1.

The autonomous driving ECU 20 is configured to be able to recognize a vehicle position which is a position of the vehicle 1 on a map, surrounding environment of the vehicle 1, and traveling state of the vehicle 1. The autonomous driving ECU 20 here, as described later, can use the vehicle position, the surrounding environment, and the traveling state acquired by a vehicle information acquisition unit 11 of a display control ECU 10 described later.

The autonomous driving ECU 20 is configured to be able to acquire map information. The autonomous driving ECU 20 here, as described later, can use the map information acquired by a map information acquisition unit 12 of the display control ECU 10.

The autonomous driving ECU 20 generates a travel plan of the vehicle 1 based on a destination, the map information, the vehicle position, an external environment, and the traveling state (vehicle speed, yaw rate, etc.). The destination may be the destination set by an occupant including the driver or may be a destination proposed by the autonomous driving system 2.

The travel plan includes a trajectory of the vehicle 1. The trajectory of the vehicle 1 means a future travel trajectory along which the vehicle 1 will travel according to the autonomous driving control. The autonomous driving ECU 20 calculates a target route (path in a lane unit) of the vehicle 1 to the destination, based on the destination, the current position of the vehicle 1 on the map, and the map information.

The autonomous driving ECU 20 may calculate a speed pattern (speed plan) for the vehicle 1 to travel along the trajectory. The autonomous driving ECU 20 may calculate the speed pattern of the vehicle 1 based on the allowable speed of the autonomous driving control set by the occupant, the set speed (for example, legal maximum speed) included in the map information, position information such as stop lines and traffic lights included in the map information, and information related to the external environment such as preceding vehicles and pedestrians. Here, the autonomous driving ECU 20 may calculate the speed pattern of the vehicle 1 according to an assist level of the executable autonomous driving control based on the acquired map information. The autonomous driving ECU 20 may generate the travel plan including the trajectory and the speed pattern of the vehicle 1 by calculating the trajectory and the speed pattern of the vehicle 1.

The autonomous driving ECU 20 may execute the autonomous driving control of the vehicle 1 based on the generated travel plan. The autonomous driving ECU 20 may execute the autonomous driving control by controlling the vehicle speed and the steering angle of the vehicle 1 by transmitting control signals to the actuator 25.

[Configuration of Display Device]

Next, an example configuration of the display device 100 will be described. The display device 100 displays an image related to the autonomous driving control of the autonomous driving system 2 on a display (display unit) 16 of the vehicle 1. The display device 100 displays the image in a display mode corresponding to the assist level of the autonomous driving control.

The display device 100 includes the display control ECU 10 on the vehicle 1, the display 16, and a communication unit 17. The display control ECU 10 is an electronic control unit including CPU, ROM, RAM, CAN communication circuit, and the like. The display control ECU 10 controls the display 16. The display control ECU 10 may be an electronic control unit incorporated into the display 16. The display control ECU 10 may be a part of the autonomous driving ECU 20.

The display 16 is a display that is mounted on the vehicle 1. The display 16 displays an image to the driver. The image is displayed in a predetermined display area of the display 16. The display 16 is controlled by the display control ECU 10 and displays the image in the display area. The display 16 is capable of changing size, shape, brightness, color, and the like of the image.

A Head Up Display (HUD) can be used as an example of the display 16. In the head-up display, the image is projected from a projection unit installed in the instrument panel of the vehicle 1 onto a display surface of a windshield (a reflection surface inside the windshield). As other examples of the display 16, a liquid crystal display including a speed meter provided on the instrument panel in front of the driver (so-called Multi Information Display (MID)), or a liquid crystal display of a navigation system may be used.

The communication unit 17 is an interface for the display device 100 to wirelessly communicate with external servers and the like. For example, the communication unit 17 may use a wireless communication standard such as LTE (Long Term Evolution).

Functions of the display control ECU 10 will be described below. As shown in FIG. 1, the display control ECU 10 has the vehicle information acquisition unit 11, the map information acquisition unit 12, an image generation unit 13, a display mode setting unit 14, and a display control unit 15, as functional configurations. The functions of the display control ECU 10 may be realized by using an electronic control unit incorporated in the display 16. The functions of the display control ECU 10 may be realized by using a portion of the autonomous driving ECU 20.

The vehicle information acquisition unit 11 acquires the vehicle position which is the position of the vehicle 1 on the map based on the position information of the GPS receiver 24 and the map information. The vehicle information acquisition unit 11 may recognize the vehicle position by a technique of SLAM (Simultaneous Localization and Mapping).

The vehicle information acquisition unit 11 acquires the external environment around the vehicle 1 based on the detection result of the external sensor 21. The external environment includes a position of the objects with respect to the vehicle 1, a relative speed of the objects with respect to the vehicle 1, and a moving direction of the objects with respect to the vehicle 1. The external environment may include lane lines and a road shape recognized by lane line recognition processing from the detection result of the external sensor 21.

The vehicle information acquisition unit 11 recognizes the current situation around the vehicle 1 based on the external environment around the vehicle 1. The current situation around the vehicle 1 means information for displaying the image of current situations around the vehicle 1 on the display 16. The current situation around the vehicle 1 includes, for example, the position of the vehicle 1 in the lane in which the vehicle 1 is currently traveling, current positions of the objects such as other vehicles around the vehicle 1, and the like. These positions of the current situation around the vehicle 1 are positions in the image in which the vehicle 1 is viewed from behind (from the rear of the vehicle 1).

The vehicle information acquisition unit 11 recognizes the traveling state of the vehicle 1 based on the detection result of the internal sensor 23. The traveling state includes, for example, the vehicle speed of the vehicle 1, the acceleration of the vehicle 1, and the yaw rate of the vehicle 1.

The map information acquisition unit 12 acquires map information used for the autonomous driving control. The map information acquisition unit 12 acquires map information (high-accuracy map information capable of performing the autonomous driving control of level 2.9) from external servers via the communication unit 17. The map information acquisition unit 12 may obtain map information (navigation map) from the map database 22 for performing the autonomous driving controls at level 2.0.

The map information acquisition unit 12 recognizes an acquisition status of the map information. The map information acquisition unit 12 recognizes the acquisition status of high-accuracy map information acquired from the external servers via the communication unit 17. To be specific, the acquisition status includes, for example, a first case in which high-accuracy map information is acquired and autonomous driving control of the predetermined assist level is executable, a second case in which high-accuracy map information is acquired and autonomous driving control of the predetermined assist level is not executable, and a third case in which high-accuracy map information is temporarily unavailable.

"High-accuracy map information is acquired" corresponds to a state in which the map information acquisition unit 12 has acquired the high-accuracy map information from the external servers via the communication unit 17 in a usable manner for executing the autonomous driving control of the predetermined assist level. "High-accuracy map information is temporarily unavailable" corresponds to a state in which the map information acquisition unit 12 cannot temporarily acquire a part or all of the high-accuracy map information from the external servers via the communication unit 17 due to, for example, incomplete downloading of the high-accuracy map information or a temporary decrease in communication quality.

"High accuracy map information is acquired and autonomous driving control of the predetermined assist level is executable" means a state in which various conditions for executing autonomous driving control at the predetermined assist level are satisfied under the condition that the high accuracy map information is acquired. "High accuracy map information is acquired and autonomous driving control of the predetermined assist level is not executable" means a state in which some or all of the various conditions for executing autonomous driving control at the predetermined assist level are not satisfied under the condition that the high accuracy map information is acquired. The various conditions include conditions that may cause the autonomous driving control at the predetermined assist level unexecutable for a period longer than an unexecutable period caused by the third case. The various conditions are conditions of whether or not the vehicle position by self-position estimation for the autonomous driving control of the vehicle 1 is specified, due to failure of the external sensor 21, for example. The various conditions are conditions other than whether the high accuracy map information is acquired or not.

The image generation unit 13 generates a status image based on the detection result of the external sensor 21 of the vehicle 1. The status image is an image to be presented to the driver of the vehicle 1. The status image corresponds to the current situation of the vehicle 1 and situation around the vehicle 1. The status image includes, for example, an image representing lane lines along the lane in which the vehicle 1 is traveling. The status image may be a bird's-eye view image representing the vehicle as if it is overlooked from behind.

FIG. 2A is a diagram showing a first display example of the status image. In FIG. 2A, an example of the status image in which autonomous driving control at level 2.9 is being executed is displayed on the display 16. The first display example in FIG. 2A corresponds to a first mode as the set display mode, in the first case in which high-accuracy map information is acquired and autonomous driving control at the predetermined assist level can be executed.

As an example, in the status image of FIG. 2A, images representing a pair of lane lines 40 and road shoulders 32 along a lane 31 in which the vehicle 1 travels are drawn along the traveling direction of the vehicle 1 in the display 16. In the lane 31 traveled by the vehicle 1, a preceding vehicle 33 is drawn in front of the traveling direction of the vehicle 1. In adjacent lanes 34, 35 of the lane 31, other vehicles 36, 37 are drawn diagonally forward of the traveling direction in the vehicle 1. In the status image of FIG. 2A, the images representing the pair of the lane lines 40 are displayed in the display 16 at a first high angle, by solid lines of a first width, extending by a first length, and having a first brightness, in order to indicate that autonomous driving control at level 2.9 is being executed. The first high angle is an angle at which the vehicle 1 is overlooked in the first case and in the second case. The word "high angle" here means a degree of the bird's-eye view angle respective to the horizontal line.

FIG. 2B is a diagram showing a second display example of the status image. In FIG. 2B, similar to FIG. 2A, another example of the status image in which autonomous driving control at level 2.9 is being executed is displayed on the display 16. The second display example in FIG. 2B corresponds to the first mode as the set display mode, in the first case in which high-accuracy map information is acquired and autonomous driving control at the predetermined assist level can be executed. In the status image of FIG. 2B, compared to the status image of FIG. 2A, the brightness of the pair of the lane lines 40 is increased up to a second brightness. The second brightness is higher than the first brightness. That is, the image generation unit 13 can generate status images in which the pair of the lane lines 40 has high visual stimulus to the driver as shown in FIG. 2A or 2B, as the status image when the acquisition status of the map information is the first case.

The display mode setting unit 14 sets the display mode of the status image based on the acquisition status of the map information. The display mode setting unit 14 sets the display mode so as to be different among the first case, the second case, and the third case.

Figure 3A:
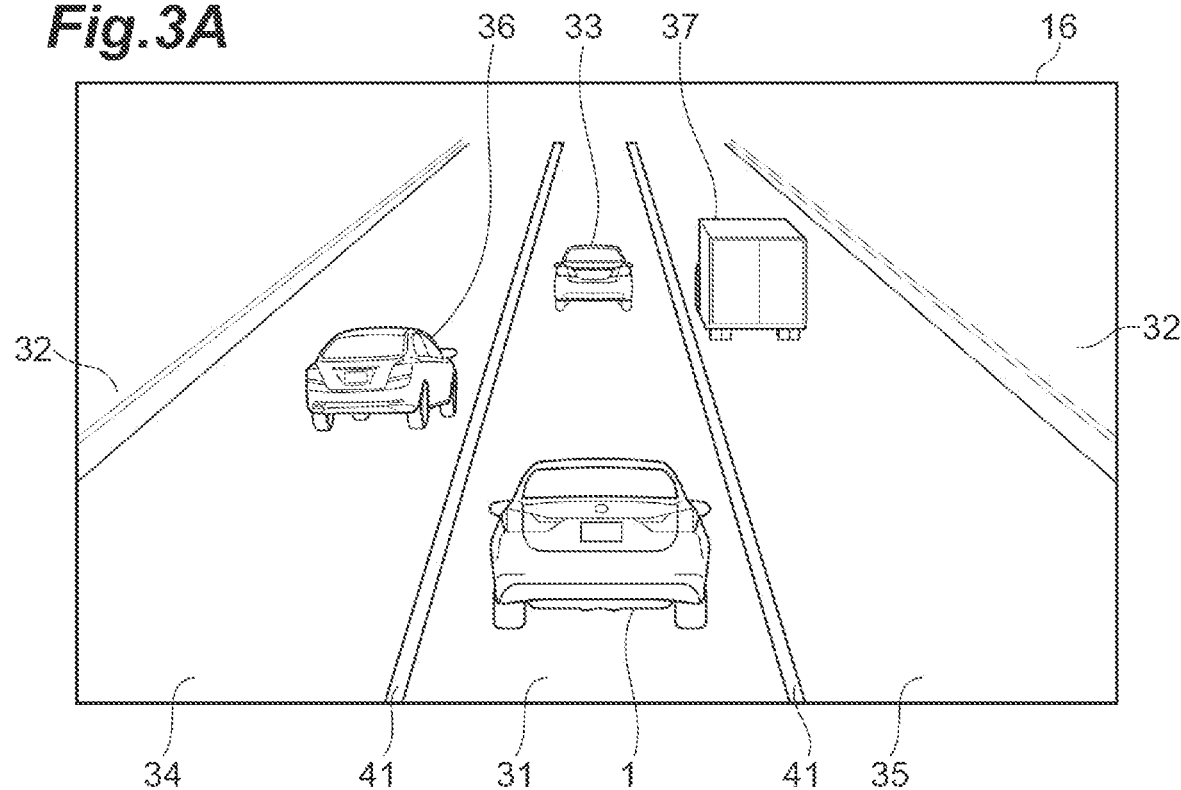
FIG. 3A is a diagram showing a third display example of the status image.

As specific examples, the display mode setting unit 14 may set the display mode such that a second width of the lane lines in the second case is narrower than the first width in the first case. FIG. 3A is a diagram showing a third display example of the status image. The third display example in FIG. 3A corresponds to a second mode as the set display mode, in the second case in which high-accuracy map information is acquired and autonomous driving control of the predetermined assist level is not executable. In the status image of FIG. 3A, images representing a pair of lane lines 41 are displayed on the display 16 by solid lines of the second width. The second width of the pair of the lane lines 41 is narrower than the first width of the pair of the lane lines 40 in FIG. 2A. The lengths of the pair of the lane lines 41 are the same as the first length of the pair of the lane lines 40 in FIG. 2A. The visual stimulus of the pair of the lane lines 41 to the driver is smaller than the visual stimulus of the pair of the lane lines 40, since the images representing the pair of the lane lines 41 are displayed on the display 16 by the solid line of the second width. This makes it easier for the driver of the vehicle 1 to recognize that the autonomous driving control at the level 2.0 is being executed, due to the conditions that may cause the autonomous driving control at the predetermined assist level unexecutable for a period longer than an unexecutable period caused by the third case.

Figure 3B:
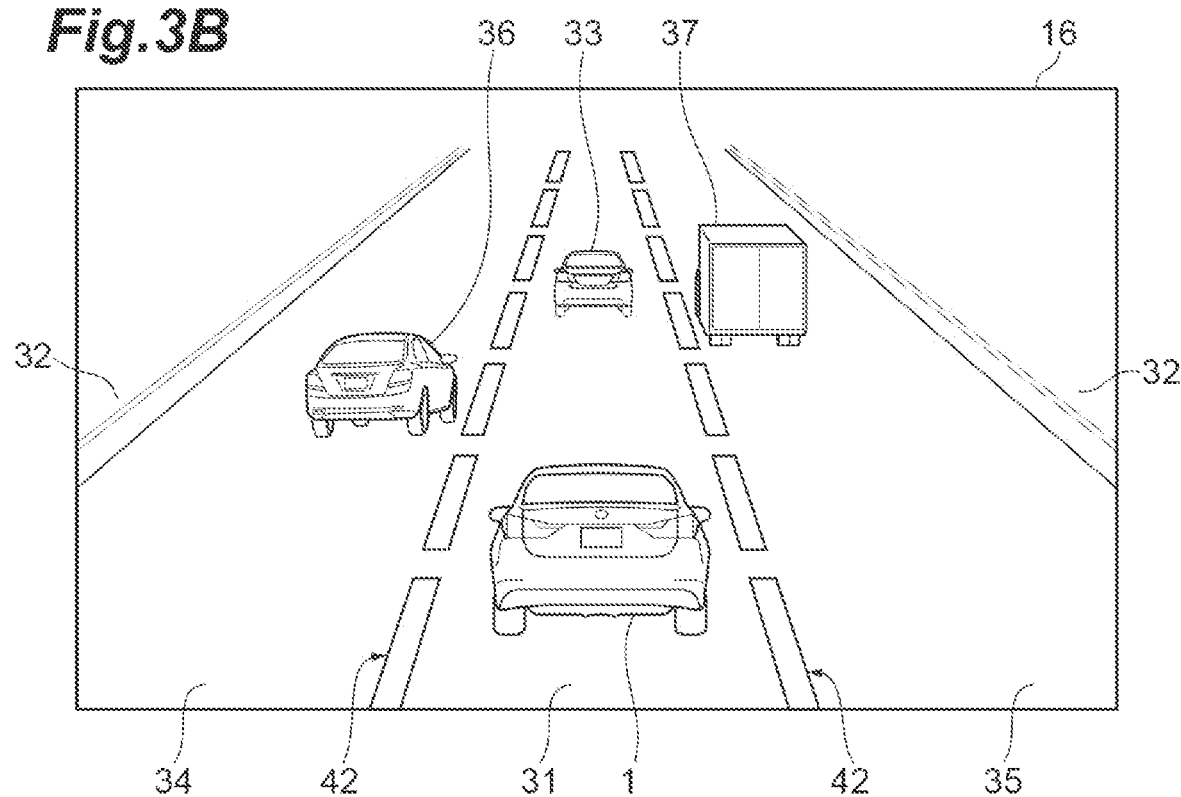
FIG. 3B is a diagram showing a fourth display example of the status image.

Unlike the solid lane line in the first case, the display mode setting unit 14 may set the display mode such that the lane lines in the second case are dashed lines themselves. FIG. 3B is a diagram showing a fourth display example of the status image. The fourth display example in FIG. 3B corresponds to the second mode as the set display mode, in the second case in which high-accuracy map information is acquired and autonomous driving control at the predetermined assist level is not executable. In the status image of FIG. 3B, images representing a pair of lane lines 42 are displayed on the display 16 as dashed lines. The widths and lengths of the pair of the lane lines 42 are the same as those of the first width and the first length of the pair of the lane lines 40 in FIG. 2A. The images representing the pair of the lane lines 42 is displayed in their own dashed lines so that the visual stimulus of the pair of the lane lines 42 to the driver is less than the visual stimulus of the pair of the lane lines 40. This makes it easier for the driver of the vehicle 1 to recognize that autonomous driving control at level 2.0 is being executed, due to conditions that may cause the autonomous driving control at the predetermined assist level unexecutable for a period longer than an unexecutable period caused by the third case.

Figure 4A:
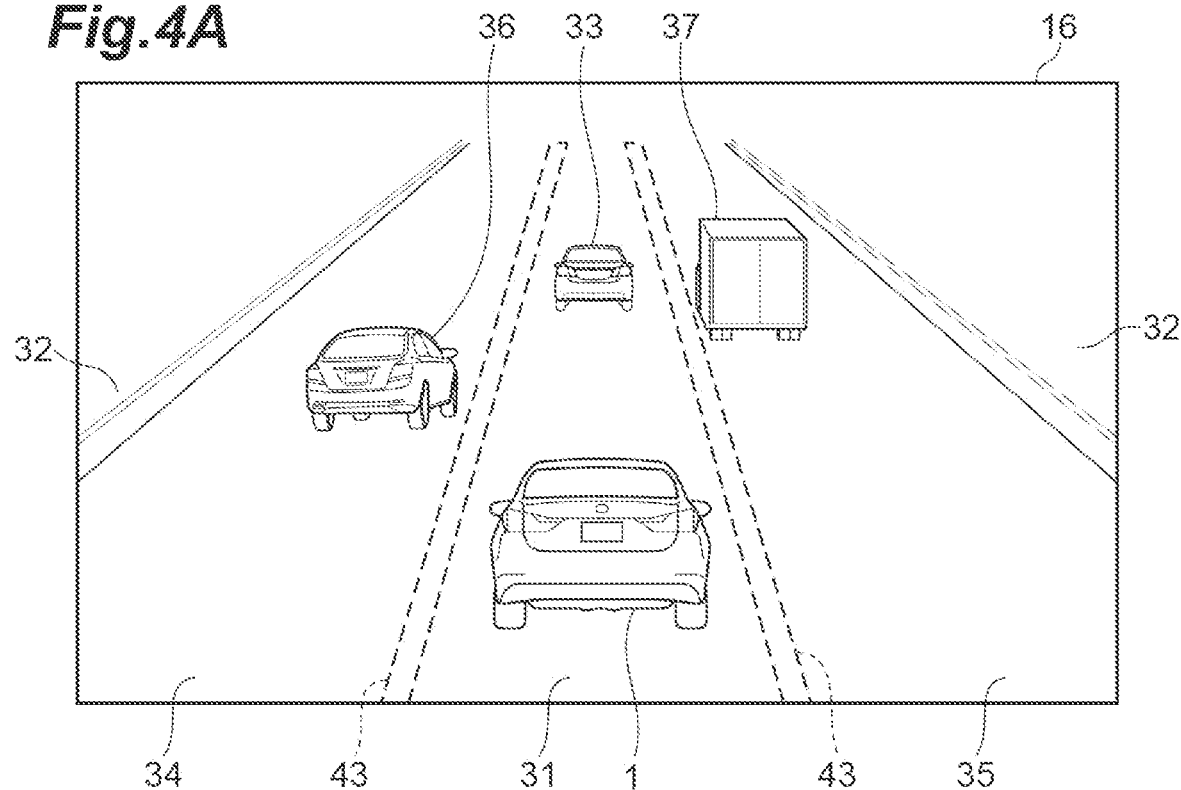
FIG. 4A is a diagram showing a fifth display example of the status image.

Unlike the solid lane line in the first case, the display mode setting unit 14 may set the display mode such that the lane lines in the second case are displayed with the lane lines only outlines or translucent. FIG. 4A is a diagram showing a fifth display example of the status image. The fifth display example of FIG. 4A corresponds to the second mode as the set display mode, in the second case in which high-accuracy map information is acquired and autonomous driving control at the predetermined assist level is not executable. In the status image of FIG. 4A, outlines of images representing a pair of lane lines 43 is displayed in dashed lines in the display 16. Alternatively, the images representing the pair of lane lines 43 may be displayed in a translucent manner within regions surrounded by the dashed lines. The widths and lengths of the regions surrounded by the dashed lines are the same as those of the first width and the first length of the pair of the lane lines 40 in FIG. 2A. The visual stimulus of the pair of lane lines 43 to the driver becomes smaller than the visual stimulus of the pair of the lane lines 40, since the pair of the dashed lines or the pair of translucent lane lines is displayed. This makes it easier for the driver of the vehicle 1 to recognize that autonomous driving control at level 2.0 is being executed, due to conditions that may cause the autonomous driving control at the predetermined assist level unexecutable for a period longer than an unexecutable period caused by the third case.

Figure 4B:
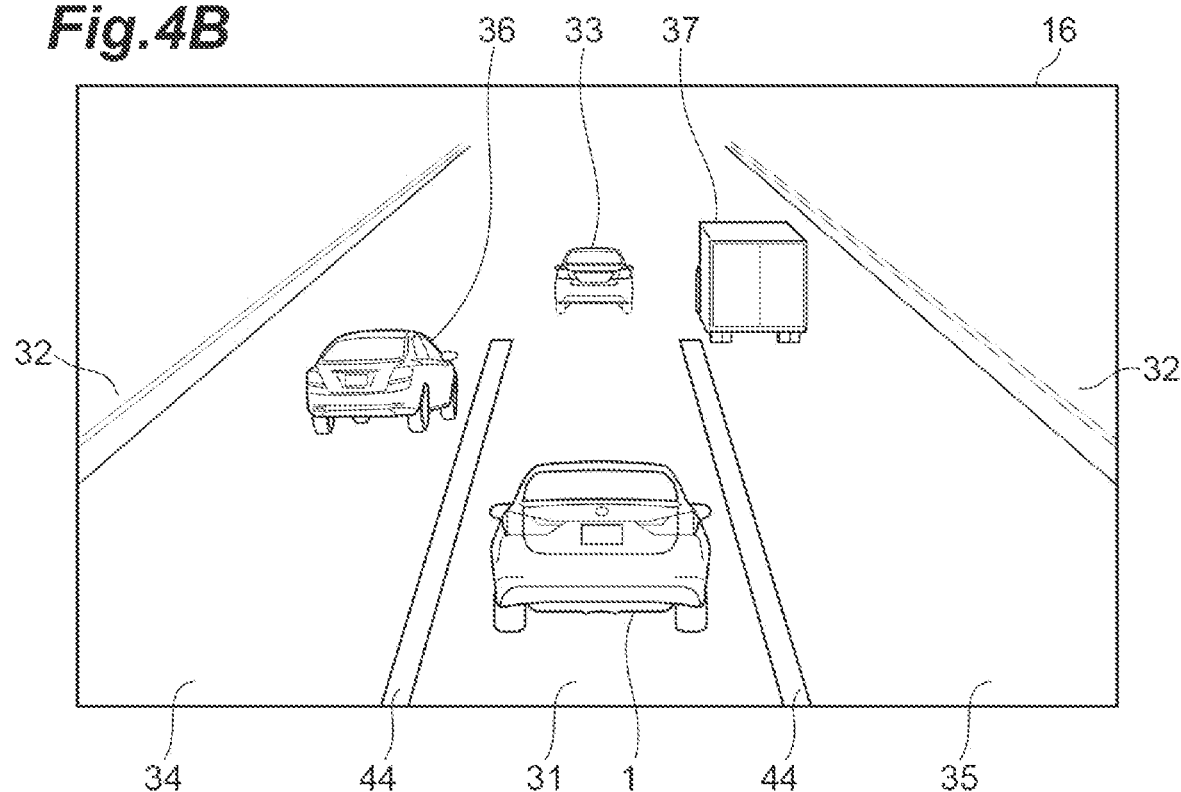
FIG. 4B is a diagram showing a sixth display example of the status image.

The display mode setting unit 14 may set the display mode such that the lengths of the images representing the pair of lane lines 44 in the third case are shorter than the lengths of the images representing the pair of the lane lines 40, 41, 42 in the first case and the second case. FIG. 4B is a diagram showing a sixth display example of the status image. The sixth display example of FIG. 4B corresponds to a third mode as the set display mode, in the third case in which high-accuracy map information is temporarily unavailable.

In the status image of FIG. 4B, images representing a pair of the lane lines 44 are displayed on the display 16 by solid lines in a second length. The second length of the pair of the lane lines 44 is shorter than the first length of the pair of the lane lines 40, 41, 42 in FIGS. 2A to 3B. The width of the pair of the lane lines 44 may be the same as or smaller than the first width between the pair of the lane lines 40, 42 in FIGS. 2A and 3B. The degree of extension of the pair of the lane lines 44 in the traveling direction of the vehicle 1 is recognized to be small, since the images representing the pair of the lane lines 44 are displayed by the solid lines in the second length. The visual stimulus of the pair of the lane lines 44 to the driver is less than the visual stimulus of the pair of the lane lines 40, 41, 42. This makes it easy for the driver of the vehicle 1 to recognize that the autonomous driving control at level 2.0 is being executed because the autonomous driving control of level 2.9 cannot be temporarily executed.

The display mode setting unit 14 may set the display mode such that a second high angle overlooking the vehicle 1 in the third case is different from the first high angle overlooking the vehicle 1 in the first case and the second case. The second high angle is an angle at which the vehicle 1 is overlooked in the third case.

Figure 5A:
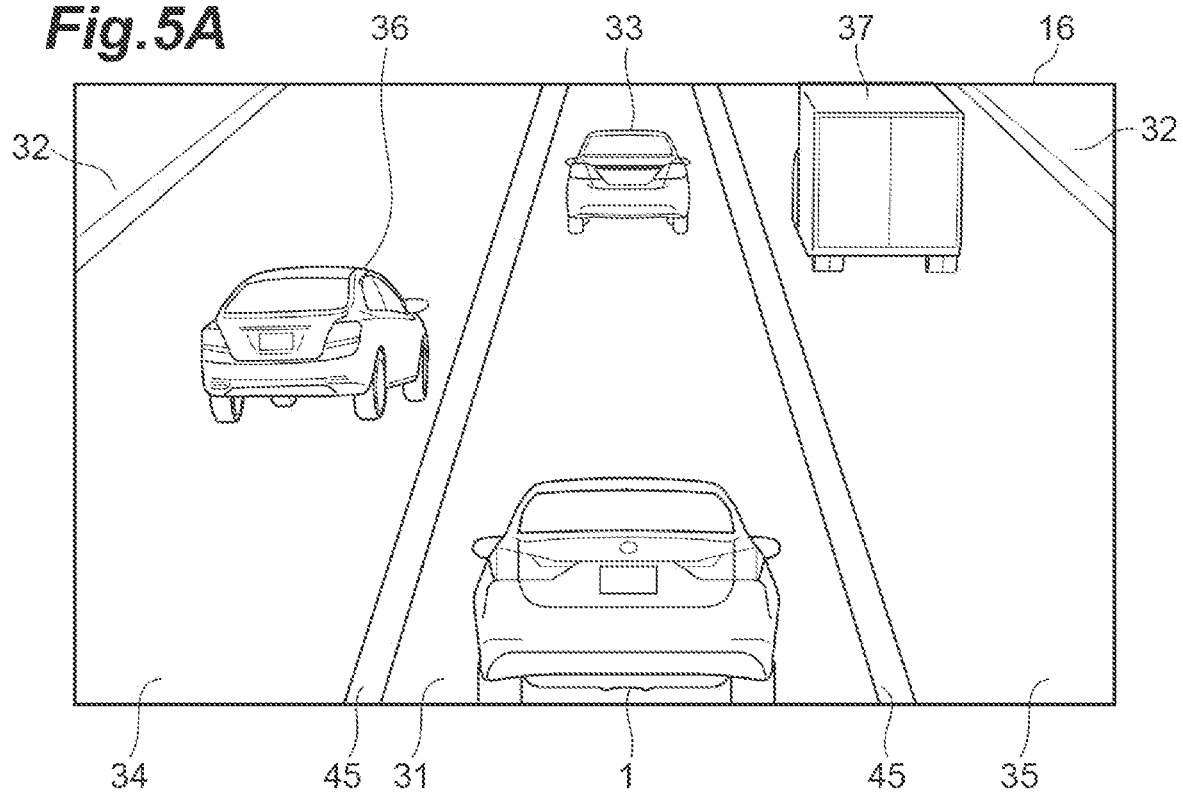
FIG. 5A is a diagram showing a seventh display example of the status image.

FIG. 5A is a diagram showing a seventh display example of the status image. The seventh display example of FIG. 5A corresponds to the third mode as the set display mode, in the third case in which high-accuracy map information is temporarily unavailable. The second high angle in the status image of FIG. 5A is higher than the first high angle in the status images of FIGS. 2A to 4A such that the vehicle 1 is looked down from higher position. In the status image of FIG. 5A, a range around the vehicle 1 to be drawn is narrower than that of the status image of FIG. 2A. The degree of extension of the pair of lane lines 45 in the traveling direction of the vehicle 1 is recognized to be shorter than that of the status images of FIGS. 2A to 4A, since the status image of FIG. 5A is displayed at the second high angle. The visual stimulus of the pair of the lane lines 45 to the driver is less than the visual stimulus of the pair of the lane lines 40, 41, 42. This makes it easy for the driver of the vehicle 1 to recognize that the autonomous driving control at level 2.0 is being executed because the autonomous driving control of level 2.9 cannot be temporarily executed.

Figure 5B:
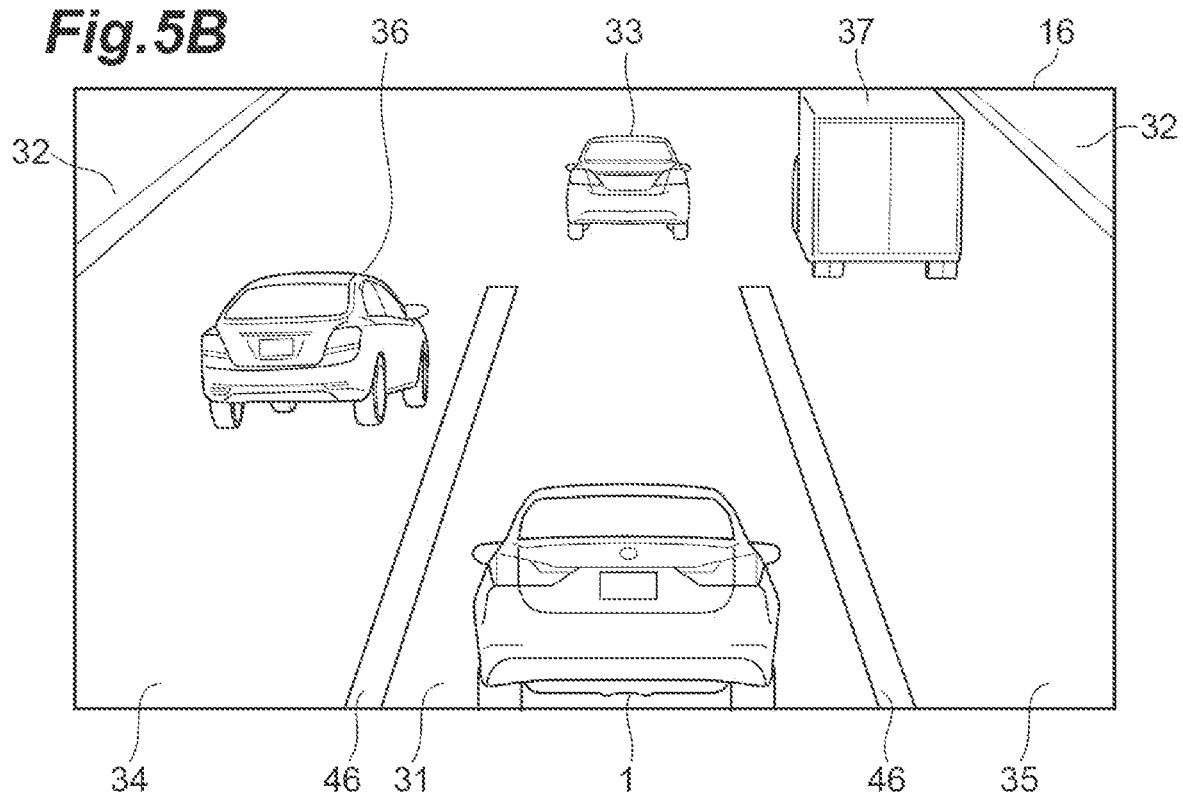
FIG. 5B is a diagram showing an eighth display example of the status image.

The display mode setting unit 14 may set the display mode such that the lengths of the images representing the pair of lane lines 46 is shorter than the lengths of the images representing the pair of the lane lines 40, 41, 42, 45 in the first case and the second case, addition to the second high angle overlooking the vehicle 1, in the third case. FIG. 5B is a diagram showing an eighth display example of the status image. The eighth display example of FIG. 5B corresponds to the third mode as the set display mode, in the third case in which high-accuracy map information is temporarily unavailable. The eighth display example of FIG. 5B corresponds to a display example in which the sixth display example of FIG. 4B and the seventh display example of FIG. 5A are combined. The second high angle in the status image of FIG. 5B is higher than the first high angle in the status images of FIGS. 2A to 4A such that the vehicle 1 is looked down from higher position. In the status image of FIG. 5B, images representing the pair of the lane lines 46 are displayed on the display 16 by solid lines in a fourth length. The fourth length of the pair of the lane lines 46 is shorter than the third length of the pair of the lane lines 45 in FIG. 5A. The width of the pair of the lane lines 46 may be the same as or narrower than the width of the pair of the lane lines 45 in FIG. 5A. In the status image of FIG. 5B, a range around the vehicle 1 to be drawn is narrower than that in the status image of FIG. 2A, and images representing the pair of the lane lines 46 are displayed in the fourth length, so that the degree of extension of the pair of the lane lines 46 in the traveling direction of the vehicle 1 is recognized to be small. Thus, the visual stimulus of the pair of the lane lines 46 to the driver is less than the visual stimulus of the pair of the lane lines 40, 41, 42, 45. This makes it easy for the driver of the vehicle 1 to recognize that the autonomous driving control at level 2.0 is being executed because the autonomous driving control of level 2.9 cannot be temporarily executed.

The display control unit 15 controls the display 16. The display control unit 15 controls the display 16 so that the display 16 displays the status image on the display 16 of the vehicle 1 in the set display mode.

In the autonomous driving control of level 2.0, the autonomous driving ECU 20 uses the external environment around the vehicle 1 detected by the external sensor 21. On the other hand, in autonomous driving control of level 2.9, using the high-accuracy map information allows the autonomous driving ECU 20 to use an additional external environment far enough from the vehicle 1 to exceed a detection range of the external sensor 21. For example, in the autonomous driving control of the level 2.9, the vehicle 1 can autonomously travel curves with less positional deviations or the like with respect to a control target (trajectory) at higher set vehicle speed compared to a case of the autonomous driving control of the level 2.0. Therefore, in the autonomous driving control of the level 2.9, the driver may feel less need for a driving preparation such as placing his/her hand on the steering wheel before the vehicle 1 enters the curves, compared to a case of the autonomous driving control of the level 2.0. In other words, the reason why the driver may feel less need for a driving preparation such as placing his/her hand on the steering wheel before the vehicle 1 enters the curves, is that the driver can recognize whether the assist level of the autonomous driving control being executed is the level 2.9 or the level 2.0, since the status image is displayed on the display 16 of the vehicle 1 in the display mode set by the display control unit 15. In addition, the driver can easily recognize whether the autonomous driving control of level 2.9 cannot be executed temporarily or not, since the display mode is set so as to be different among the first case, the second case, and the third case.

[Processing of the Display Device 100]

Figure 6:
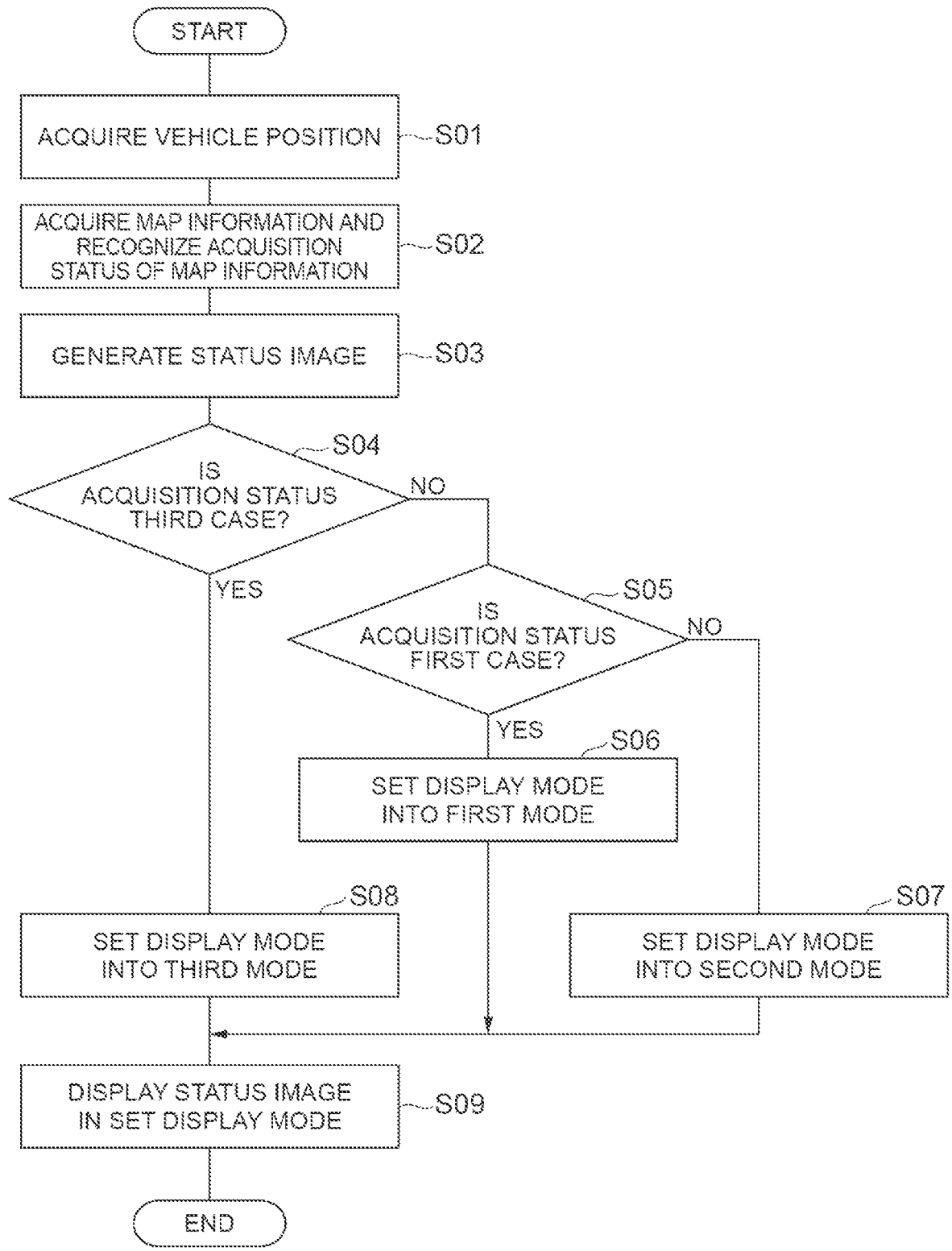
FIG. 6 is a flowchart showing an example of processing performed by the display control ECU of the display device.

Next, the example processing of the display device 100 will be described with reference to the flowchart of FIG. 6. FIG. 6 is a flowchart showing an example of processing of the display device. The process shown in FIG. 6 is executed while the vehicle 1 is running, for example.

As shown in FIG. 6, the display control ECU 10 of the display device 100 acquires the vehicle position of the vehicle 1 by the vehicle information acquisition unit 11 in S01. For example, the vehicle information acquisition unit 11 acquires the vehicle position of the vehicle 1 based on the measurement result of the GPS receiver 24.

In S02, the display control ECU 10 acquires map information and recognizes the acquisition status of the map information by the map information acquisition unit 12. For example, the map information acquisition unit 12 acquires map information around the vehicle position of the vehicle 1 from external servers via the communication unit 17. The map information acquisition unit 12 recognizes the acquisition status of the current map information based on the acquisition result of the map information. The map information acquisition unit 12 recognizes whether the acquisition status corresponds to, for example, the first case in which high-accuracy map information is acquired and autonomous driving control of the predetermined assist level is executable, the second case in which high-accuracy map information is acquired and autonomous driving control of the predetermined assist level is not executable, or the third case in which high-accuracy map information is not temporarily available.

In S03, the display control ECU 10 generates the status image representing the current situation by the image generation unit 13. Based on the detection result of the external sensor 21 of the vehicle 1, the image generation unit 13 generates the status image corresponding to the current situation of the vehicle 1 and situation around the vehicle 1 for presentation to the vehicle 1 driver.

The display control ECU 10 sets the display mode of the status image by the display mode setting unit 14 in S04 to S08. The display mode setting unit 14 sets the display mode of the status image based on the acquisition status of the map information. The display mode setting unit 14 sets the display mode so as to be different among the first case, the second case and the third case.

In S04, the display control ECU 10 determines whether or not the acquisition status of the map information corresponds to the third case by the display mode setting unit 14. When it is determined by the display mode setting unit 14 that the acquisition status of the map information corresponds to the third case, the display control ECU 10 proceeds to processing of S08. If it is determined by the display mode setting unit 14 that the acquisition status of the map information does not correspond to the third case, the display control ECU 10 proceeds to processing of S05.

In S05, the display control ECU 10 determines whether or not the acquisition status of the map information corresponds to the first case by the display mode setting unit 14. When it is determined by the display mode setting unit 14 that the acquisition status of the map information corresponds to the first case, the display control ECU 10 proceeds to processing of S06. If it is determined by the display mode setting unit 14 that the acquisition status of the map information does not correspond to the first case, the display control ECU 10 proceeds to processing of S07.

The display control ECU 10 sets the display mode to the first mode by the display mode setting unit 14 in S06. The display mode setting unit 14 sets the display mode of the status image when the acquisition status corresponds to the first case, to the first mode. The display control ECU 10 then proceeds to processing of S09.

The display control ECU 10 sets the display mode to the second mode by the display mode setting unit 14 in S07. The display mode setting unit 14 sets the display mode of the status image when the acquisition status is neither the first case nor the third case, to the second mode. The display control ECU 10 then proceeds to processing of S09.

The display control ECU 10 sets the display mode to the third mode by the display mode setting unit 14 in S08. The display mode setting unit 14 sets the display mode of the status image when the acquisition status corresponds to the third case, to the third mode. The display control ECU 10 then proceeds to processing of S09.

The display control ECU 10 displays the status image in the set display mode by the display control unit 15 in the S09. The display control unit 15 displays the status image on the display 16 of the vehicle 1 in the set display mode based on the setting result of the display mode. Thereafter, the display control ECU 10 ends the processes of FIG. 6.

As described above, according to the display device 100, the display mode of the status image in the third case in which the map information is temporarily unavailable is set so as to be different from the first case and the second case. The first case is a case in which the map information is acquired and the autonomous driving control at the predetermined assist level is allowed to be executed. The second case is a case in which the map information is acquired and the autonomous driving control at the predetermined assist level is not allowed to be executed. Therefore, the driver can more easily recognize that the autonomous driving control at the predetermined assist level is not actually executed, by recognizing the status image displayed in the display mode of the third case.

In the display device 100, the status image includes images representing the lane lines 40, 41, 42, 44, 45, 46 along the lane in which the vehicle 1 is traveling. The display mode setting unit 14 sets the display mode such that the image representing the lane lines 44 in the third case is shorter than the images representing the lane lines 40, 41, 42 in the first case and the second case. The display mode setting unit 14 sets the display mode such that the image representing the lane lines 46 in the third case is shorter than the images representing the lane lines 45 in the second case. Accordingly, the driver can more easily recognize that the autonomous driving control at the predetermined assist level is not actually executed, since the driver recognizes the image representing the pairs of the lane lines 44, 46 that appears shorter extending in the traveling direction of the vehicle.

In the display device 100, the status images are bird's-eye view images representing the vehicle from the rear of the vehicle. The display mode setting unit 14 sets the display mode such that the second high angle at which the vehicle is viewed from the rear in the third case is different from the first high angle at which the vehicle is viewed from the rear in the first case and the second case. Accordingly, the driver recognizes more easily that the autonomous driving control at the predetermined assist level is not actually executed, since the driver recognizes the bird's-eye view image in the third case, which represents the vehicle from the rear at the different angle from the first high angle in the first case and the second case.

Although the example of the present disclosure has been described above, the present disclosure is not limited to the above-described example.

In the above-described example, the display mode setting unit 14 sets the display mode such that the lengths of the lane line images in the third case are shorter than the lengths of the lane line images in the first case and the second case, by shortening far-sides of the lane line images in the traveling direction of the vehicle 1. However, the display mode in the third case is not limited to this example. The display mode setting unit 14 may set the display mode such that the lengths of the lane line images in the third case are shorter than the lengths of the lane line images in the first case and the second case, by shortening near-sides of the lane line images in the traveling direction of the vehicle 1.

In the above-described example, the example of the predetermined assist level is level 2.9 of the autonomous driving control. However, the predetermined assist level is not limited to this example. The predetermined assist level may be an assist level higher than the level 2.9. In short, the predetermined assist level may be higher than the level 2.0 at which the map for navigation is just used (at which the high-accuracy map information is not used).

What is claimed is:

1. A display device provided in a vehicle configured to acquire map information that allows an autonomous driving control at a predetermined assist level to be executed, and configured to execute the autonomous driving control at the predetermined assist level based on the map information, the display device comprising:
   a memory that stores a program; and
   a processor configured to execute the program stored in the memory, so as to:
   generate a status image presented to a driver of the vehicle based on detection result of an external sensor of the vehicle, the status image representing a current status of the vehicle and surroundings of the vehicle;
   acquire the map information and recognize an acquisition status of the map information;
   set a display mode of the status image based on the acquisition status of the map information; and
   display the status image on a display unit of the vehicle in the display mode; wherein
   the acquisition status includes a first case in which the map information is acquired and the autonomous driving control at the predetermined assist level is allowed to be executed, a second case in which the map information is acquired and the autonomous driving control at the predetermined assist level is not allowed to be executed, and a third case in which the map information is temporarily unavailable, and
   the display mode is set so that the display mode of the first case, the display mode of the second case and the display mode of the third case are different from each other.

2. The display device according to claim 1, wherein
   the status image includes an image representing a lane line along a lane in which the vehicle is traveling, and
   the processor is configured to set the display mode such that the image representing the lane line in the third case is shorter than the image representing the lane line in the first case and the second case.

3. The display device according to claim 1, wherein
   the status image is displayed as a bird's-eye view image representing the vehicle from a rear of the vehicle, and
   the processor is configured to set the display mode such that an angle at which the vehicle is viewed from the rear in the third case is different from angles at which the vehicle is viewed from the rear in the first case and the second case.

4. The display device according to claim 2, wherein
   the status image is displayed as a bird's-eye view image representing the vehicle from a rear of the vehicle, and
   the processor is configured to set the display mode such that an angle at which the vehicle is viewed from the rear in the third case is different from angles at which the vehicle is viewed from the rear in the first case and the second case.

* * * * *